Jan. 17, 1950 H. L. WELCH 2,495,083
VISE FOR TYING LEADER ENDS
Filed Sept. 19, 1947
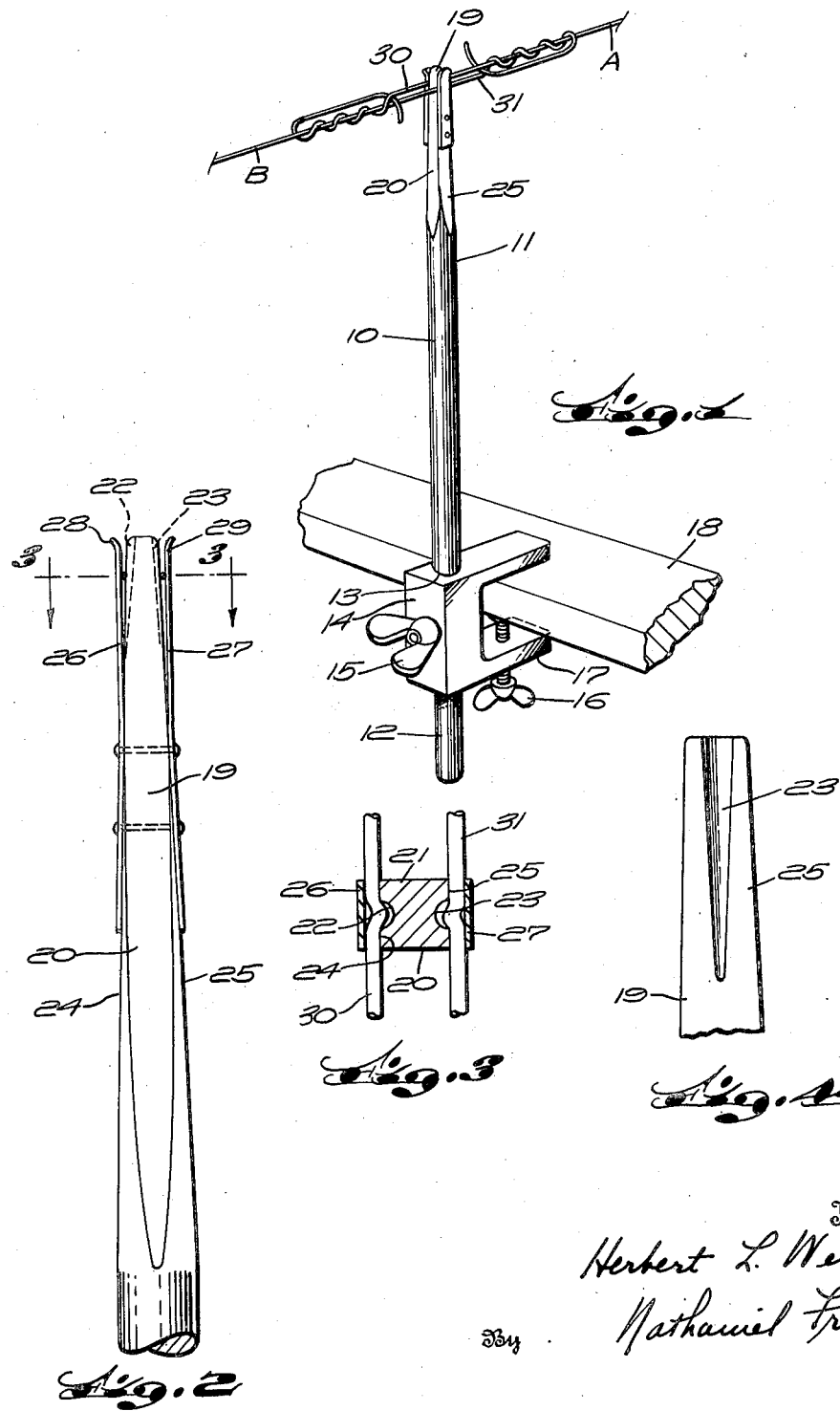

Patented Jan. 17, 1950

2,495,083

UNITED STATES PATENT OFFICE 2,495,083

VISE FOR TYING LEADER ENDS

Herbert L. Welch, Oqussoc, Maine, assignor to Ashaway Line & Twine Mfg. Co., a corporation of Rhode Island Application September 19, 1947, Serial No. 775,007

1 Claim. (Cl. 24—81)

The present invention relates to pleasure fishing apparatus, and has particular reference to a novel construction for a leader tying vise.

The principal object of the invention is to provide a leader tying vise of small size which may be readily attached for use to an available support, such as the side or the seat of a boat.

Another object of the invention is to provide a vise which detachably holds two leader ends in position for rapid tying.

Still another object of the invention is to utilize spring fingers for releasably gripping two leader ends for the tying operation.

With the above and other objects and advantageous features in view, the invention consists of a novel arrangement of parts more fully disclosed in the detailed description following, in conjunction with the accompanying drawings, and more specifically defined in the claims appended thereto.

In the drawings:

Fig. 1 is a perspective view showing the novel vise secured to a board and in leader tying position;

Fig. 2 is an enlarged detail side view of the vise tip;

Fig. 3 is an enlarged section on the line 3—3 of Fig. 2; and

Fig. 4 is a front view of the vise tip, the spring finger being removed.

It has been found desirable to provide a small portable vise for tying leaders, which may be readily mounted on any available support, and which will secure the ends of two leader lines and releasably hold the ends so as to permit quick tying thereof. To this end, I provide a rod of small size which is mounted in a clamp element and has its upper end or tip squared and reduced, two spring fingers being mounted on opposite sides of the tip for respectively releasably gripping the ends of two leader lines in overhanging relation, whereby the ends may be readily tied together.

Referring to the drawings, the vise 10 includes a rod 11 which is preferably of wood and has its lower end 12 extending through a bore 13 in a metal clamp 14 and locked in place by a wing screw 15, the clamp being U-shaped as illustrated in Fig. 1, and provided with a wing screw 16 in one jaw 17 for releasably attaching the vise to a suitable support 18.

The upper end of the rod 11 is squared and reduced to provide a tapered square tip 19 which is rounded at the upper ends of two opposite sides 20, 21, and has tapered V grooves 22, 23 extending longitudinally of the other sides 24, 25. Spring fingers 26, 27 of resilient metal are secured at their lower ends to the grooved sides 24, 25, and have their tips 28, 29 slightly curled outwardly to permit ready insertion of the ends 30, 31 of leader lines A, B, between the spring fingers and the contiguous tip sides.

When so inserted the leader ends 30, 31 are tightly gripped at two spaced points, as illustrated in Fig. 3, and each end may be readily wound around the other line as shown in Fig. 1, whereby an upward stretching pull on the two lines ties a perfect knot.

Although I have described a specific constructional embodiment of the invention, it is obvious that changes in the size, shape and material of the parts and in their respective proportions, may be made to suit different holding requirements for tying lines, without departing from the spirit and the scope of the invention as defined in the appended claim.

I claim:

A vise for tying leaders and the like, comprising a rod member having its lower end adapted to be secured to a support, said member having an upper tip end of square cross-section and tapering towards the upper end, and spring fingers mounted on opposite sides of the tip end for releasably gripping leader lines between the spring fingers and the contiguous tip end sides, said spring fingers having their upper ends bent outwardly, the sides of the tip ends contiguous the spring fingers each having a longitudinal downwardly tapered V-shaped groove.

HERBERT L. WELCH.

REFERENCES CITED

The following references are of record in the file of this patent:

UNITED STATES PATENTS

| Number | Name | Date |
| --- | --- | --- |
| 466,932 | Cornell | Jan. 12, 1892 |
| 725,586 | Pool | Aug. 14, 1903 |
| 742,008 | Cook | Oct. 20, 1903 |
| 743,106 | Rotz | Nov. 3, 1903 |
| 1,326,911 | Carlson | Jan. 6, 1920 |
| 1,423,868 | Monahan | July 25, 1922 |
| 1,466,563 | Rutherford | Aug. 28, 1923 |